J. B. COTTARD.
CONDENSING APPARATUS.
APPLICATION FILED JULY 10, 1918.

1,337,200.

Patented Apr. 20, 1920.
3 SHEETS—SHEET 1.

Inventor.
Jean Baptiste Cottard by Mauro, Cameron, Lewis & Massie
Attorneys.

J. B. COTTARD.
CONDENSING APPARATUS.
APPLICATION FILED JULY 10, 1918.

1,337,200.

Patented Apr. 20, 1920.
3 SHEETS—SHEET 2.

Inventor
Jean Baptiste Cottard
by, Mauro, Cameron, Lewis & Massie
Attorneys.

J. B. COTTARD.
CONDENSING APPARATUS.
APPLICATION FILED JULY 10, 1918.
1,337,200.
Patented Apr. 20, 1920.
3 SHEETS—SHEET 3.
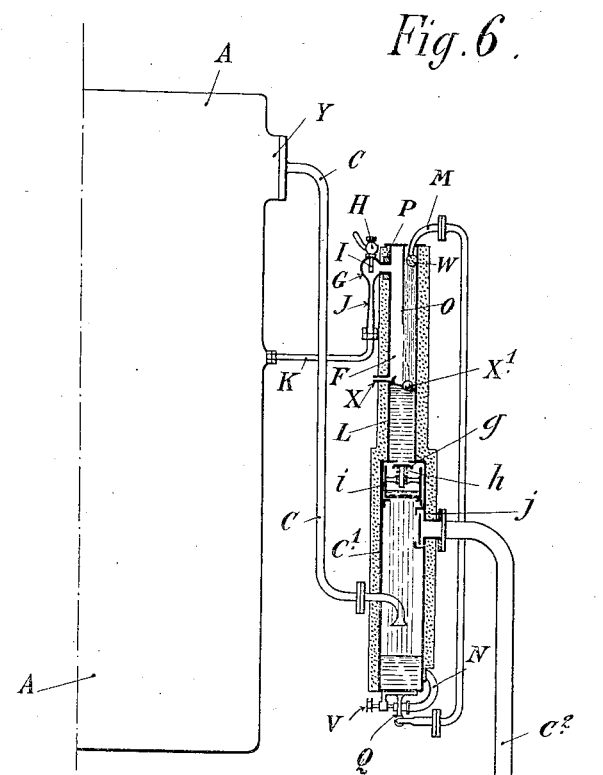
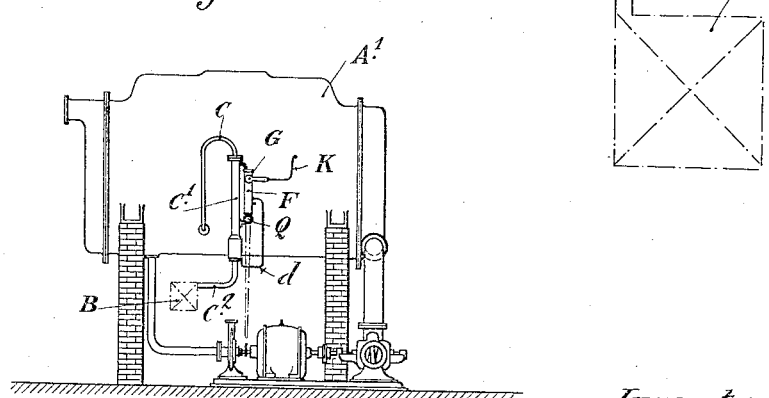
Inventor.
Jean Baptiste Cottard
by, Mauro, Cameron, Lewis & Massie,
Attorneys.

UNITED STATES PATENT OFFICE.

JEAN BAPTISTE COTTARD, OF PARIS, FRANCE.

CONDENSING APPARATUS.

1,337,200.  Specification of Letters Patent.  Patented Apr. 20, 1920.

Application filed July 10, 1918. Serial No. 244,301.

*To all whom it may concern:*

Be it known that I, JEAN BAPTISTE COTTARD, citizen of the French Republic, residing at 135 Rue de la Convention, Paris, France, have invented certain new and useful Improvements in Condensing Apparatus, of which the following is a specification.

For the purpose of augmenting the vacuum in vapor condensers comprising means for extracting water and air, various devices have been constructed which utilize the known principle of subjecting the air to a cooling action immediately prior to its extraction by the vacuum producing apparatus or air pump, in order to set up the condensation of a part of the water vapor that saturates the aspirated air, and, therefore, to diminish materially the weight of the mixture to be extracted by the vacuum forming apparatus.

It is known, moreover, that the air pump in such apparatus will create high vacua so much the more easily as the weight it has to extract is reduced.

Existing systems not being provided with means for lowering the temperature of the water for cooling the extracted air, rely on cool water being available. There are condensing installations wherein the temperature of the water for cooling the air is very nearly the temperature of the extracted air, and there are other installations where the water both for cooling the condenser and also for cooling the air comes from the same source.

The cooling of the extracted air, carried out under the latter conditions has the inconvenience that only incomplete results are attained.

The present invention has for its object to provide means that render possible an effective cooling of the extracted air, in the case where the water so employed is not of a temperature sufficiently low.

To this end, the air induction pipe of the condenser is surrounded with a cooling device which is of small size and adapted exclusively to lower the temperature of the air extracted from this condenser, to a desired degree in order that the pressure of the air (the pressure of the air when dry) may be made very nearly equal to the general pressure in the condenser, which, not only causes a diminution of weight in consequence of the condensation of a great part of the suspended water vapor, but also diminution of the volume to be withdrawn by the extracting apparatus or air pump, an advantage which may be appreciable when certain types of such apparatus are employed. The vacuum augmenter, thus coöperating, is arranged between the main condenser and the air pump thereof; this augmenter or cooling device associated with the principal condenser, replaces a section or portion of the air induction piping of which it forms a part. It may be jacketed with heat insulating material; it needs no looking after and its upkeep is practically *nil*.

Different forms of the cooling device subsidiary to and combined directly with the condenser are shown by way of example on the accompanying drawings.

The improved condenser, arranged according to the invention, comprises a principal or main condenser, with its air extracting device, and an auxiliary condenser. But what chiefly characterizes the novel installation is that the cooling surface (the cold liquid circulating conduit) or the device for sprinkling or atomizing the cold liquid of the auxiliary condenser, is constituted by the cooling medium of the subsidiary cooling device, the auxiliary condenser being adapted to effect the cooling.

The refrigerating means employed is of known type, the principle of evaporation in a vacuum being employed.

Practically the principal condenser can be used to absorb the heat carried over by the extracted air and the condensation of the saturated vapor in the induction pipe, augmented by the heat corresponding to the work of the cooling device in producing the cooling action.

For this purpose, the exhaust of the ejector which creates the vacuum in the evaporator of the cooling device can be connected directly to the condenser; the compression brought about by this ejector is very small in most cases and the quantity of steam, necessary for its functioning, is also very small.

In the accompanying drawings, Figure 1 is a vertical section of the vacuum augmenter arranged between a mixing condenser, of any appropriate type, and an air extracting apparatus or air pump.

Fig. 5 is an elevation showing the application of the invention to a surface condenser installation.

Fig. 6 represents in sectional elevation an arrangement of refrigerating means comprising a sprinkling cooling element in lieu of a surface cooling element as in the preceding examples.

Figure 1:
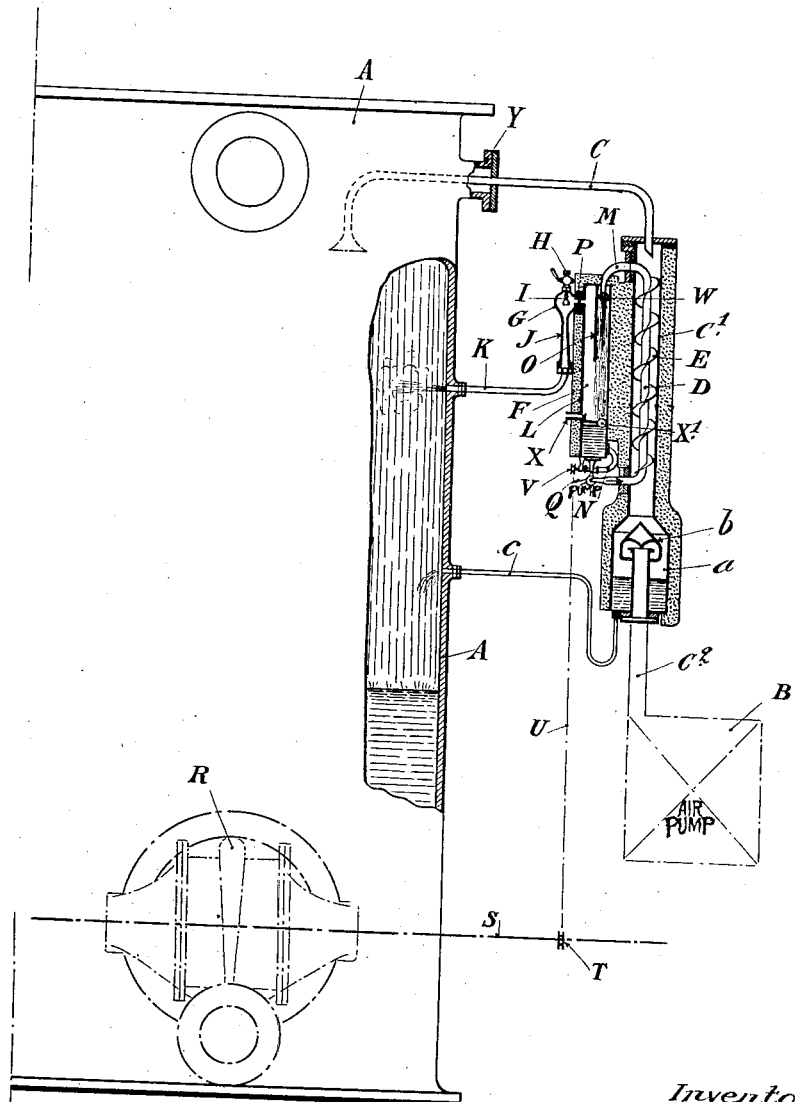

In the example shown in Fig. 1, A represents a mixing condenser; B its air extracting apparatus; C, $C^1$, $C^2$ induction pipes connecting the above members. The piping $C^1$ forms the outer casing of an auxiliary condenser whose cooling surface is constituted by a tube D provided with a helical rib E which increases the surface and at the same time gives to the mixture of air and water vapor, which comes in contact with it, the most favorable speed for the utilization of the surface through which the heat is extracted.

The ribbed tube D E is in reality the cooling medium of the small refrigerator whose evaporator is shown at F. This auxiliary device comprises an ejector G, to which is admitted, by means of a cock H, steam from any source; this steam is projected in the form of a jet at great speed by a nozzle I through the doubly coned space J. The steam jet issuing from the nozzle I creates in evaporator F a vacuum higher than that in condenser A and draws into evaporator F a certain quantity of vapor which it compresses, along with the fed steam, to the pressure of the principal condenser A into which it passes by the pipe K.

The cooling device may be devoid of the usual condenser, as the principal condenser accomplishes, simultaneously with its own proper functioning, that of the condenser of the said cooling device.

The evaporator of the cooling device comprises a tubular receptacle L, closed at its upper part by a cover having a tubulure M for the supply of cooling water and at its lower part a bottom having a tubulure N for the exit of the cooled water. A partition O insures dryness to the saturated vapor which the ejector G induces through the port P.

The piping M is connected with the upper end of the ribbed pipe D E constituting the cooler. Below the evaporator F is fixed a small rotary pump Q whose inlet is connected to the piping N. This pump deals with the cooled water in evaporator F and forces it through the ribbed pipe D E.

This pump can be driven by the customary working pump or pumps of the principal condenser by means of a pulley keyed to its driving shaft; for instance, if R is the condenser water extracting pump and S is the driving shaft, a grooved pulley T, or merely a circular groove on the shaft, will permit the driving, by means of the rope or connection U and pulley V, of the pump Q for the circulating cooling water.

Under the influence of the vacuum created by ejector G, the water in evaporator F is partially evaporated, the liquid remaining therein being correspondingly reduced in temperature; the liquid thus cooled, having accomplished its task of cooling the member D E, returns, slightly re-heated, into evaporator F through a distributing device W which is provided with a number of small holes and distributes the liquid over a large evaporation surface; this liquid is cooled afresh in falling to the bottom of the evaporator, it is continuously circulated by pump Q which forces it again through the ribbed tube, maintaining the cooling member at the requisite low temperature. For maintaining the level in the evaporator F constant, this latter is provided with a pipe X through which water is admitted, the quantity being regulated by a small float valve $X^1$; the weight of water thus drawn in automatically corresponds with that withdrawn by the ejector G, in the form of steam; this quantity of water being very small, the valve and its float are of dimensions so small that they can be arranged within the evaporator F in spite of the smallness of the latter.

The air discharge pipe Y of the condenser A is traversed by the branch C of the air extraction pipe. This branch C is suitably proportioned to the volume of air which when saturated with vapor has to pass, in order not to increase uselessly the work of the cooling device. The size of the conduit C allows of it being extended to the interior of the condenser A in order that the extraction of the air may be at the most favorable place; the free extremity of this conduit is sufficiently spread out to facilitate the entry of the air. The principle whereby the size of the conduit C is determined is that wherein the outflow of vapor is regulated to be in harmony with the capacity of absorbing heat which the absorber possesses.

Under the action of the air extracting apparatus of the condenser, the mixture of air and saturated vapor passes through the conduit C into contact with the cooling element D E wherein the cooled water circulates in the opposite direction to the flow of air in the branch $C^1$. By contact with this cooling element the water vapor contained in the air is condensed in part whereby there is a diminution of weight to be extracted. At the same time the pressure of the remaining water vapor is lowered to about that which corresponds to the temperature of the cooled wall of the cooling element D E; the total pressure (air and vapor) remaining very nearly constant, an increase in the pressure of the air and consequently a diminution of volume to be extracted results.

The mixture thus treated, diminished in weight and reduced in volume, is then drawn through the conduit $C^2$ by the extracting apparatus B.

The lower part of tube $C^1$ forms a suction chamber $a$. The vapor, which is condensed on the cooling element D E, carried along by the descending suctional current along the rib E arrives in the form of drops of water in the chamber $a$; the weight of this condensed water helps to diminish that which would normally be sucked out by the extractor or pump B; every precaution is taken that this water may be eliminated from the mixture which is drawn in through the conduit $C^2$ and for this purpose this is shielded by a cover $b$.

The condensed water can flow directly to the condenser by a conduit $c$ appropriately disposed so that there always remains in chamber $a$, a cold water seal with which the air contacts immediately before its extraction by the air pump which stabilizes the extraction temperature and, thus assures the constancy of the vacuum in the principal condenser. In lieu of conducting the condensed water from chamber $a$ to condenser A by the pipe $c$, the excess of pressure in $a$ over that in evaporator F can be made use of to lift into this evaporator the condensed water from chamber $a$.

The insertion in a condensing system of a vacuum augmenting apparatus which allows of a vacuum being attained equal to a theoretical vaccum, has indisputable advantages especially for steam turbine condensers; but it is not necessary that the whole functioning of this augmenter should be confined to this effort.

The economy due to the novel apparatus is obtained without expenditure in other directions.

In fact, owing to the efficient cooling that the described augmenter allows to be obtained, the induced mixture is deprived of a weight of vapor such that the power of the apparatus for causing the vacuum for extracting the air from the condenser can be maintained at about double of that which is necessary for insuring the extraction under the new conditions; and it is this excess of power which permits the extracting apparatus to bring about the desired increase in the vacuum.

If one be content with a slightly less excess the air extracting apparatus may still have an exhausting effort which is much greater than that obtained by existing means.

It is then from the work of the air extracting apparatus, that one can deduct or acquire the small power necessary for the working of the augmenter.

Thus, for example, if the air extracting condenser works by jets of steam, one can, without disadvantageously influencing its action and owing to the excess of power obtained, diminish by some hundreds of grams the pressure of the steam fed to this apparatus so as to reduce the supply of steam by a quantity equal to that necessary for the working of the augmenter.

If the vacuum producing apparatus works by any other means than that of jets of steam (rotary dry compressors, piston pumps and the like) the power necessary for working the augmenter would be deducted from the power absorbed by this vacuum producing apparatus.

In the practically possible applications the addition of the vacuum augmenter besides what arises from its own working gives rise to other advantages, due to the augmented vacuum, that is to say, less consumption of steam in the case of a steam engine or, with the same consumption of steam, an increase in the working capacity of the engine.

Joined to a mixing condenser with parallel currents, the augmenter will allow of vacua being obtained at least equal to those obtained with a methodical circulation.

The combination of the augmenter with a condensing system, effecting substantially a theoretical vacuum (for instance in a mixing condenser with methodical circulation or a surface condenser) will permit of the power absorbed by the air extracting apparatus being reduced.

Generally speaking, the augmenter will permit of defective condensing installations yielding a better result.

Another example is that of the installation where there is a difference between the theoretical vacuum and the actual vacuum if this actual vacuum is properly estimated; in this case, the augmenter working with the same vacuum can still exercise useful effect, that of permitting the condensation water being extracted from the condenser at a higher temperature, so that there is a diminution in the quantity of water expended.

Figure 2:
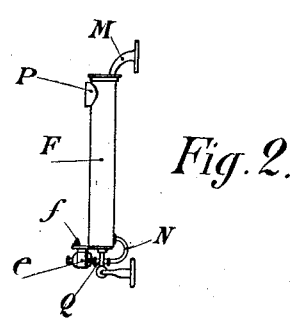
Fig. 2 shows a power actuated control of the cold water circulating pump of the refrigerating means.

If the working of the intensifier pump is not possible through the medium of the shaft of the working pumps in consequence of distance or other reasons (barometric or other condensers) recourse can be had to the working means represented in Fig. 2.

In this example, the pump of the augmenter is attached directly to an electric motor $e$ fixed, like pump Q, below evaporator F; centrifugal turbine pump Q being mounted in an overhanging manner on the motor shaft, the common base piece carrying an interrupter $f$; this arrangement is thus independent of the other parts of the installation.

Figure 3:
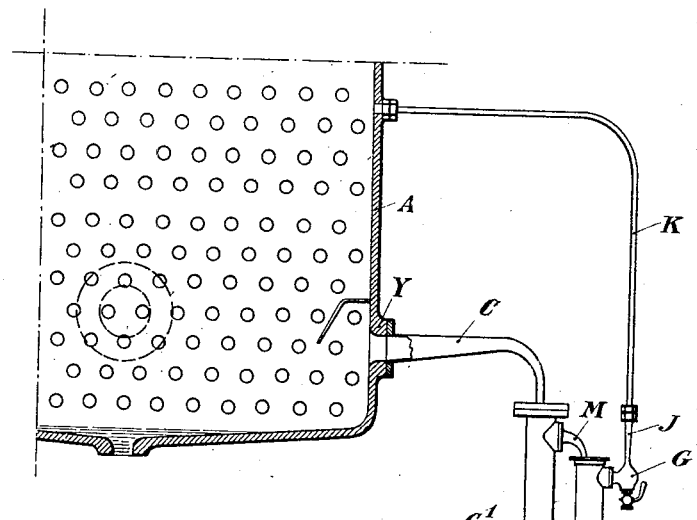
Fig. 3 represents the application of the augmenter to a surface condenser.

Fig. 3 shows the adaptation of the vacuum augmenter to a surface condenser. The exterior view of the apparatus with jacket removed is shown, the apparatus being interposed between the surface condenser A and the vacuum apparatus B. It takes the place of a portion of the induction tube.

The water condensed from the induced mixture is raised by means of the difference of pressure in $a$ and F through the conduit $d$.

The working of the system is the same as that in the example of Fig. 1. The flow of the condensate from chamber $a$ to the principal surface condenser A, can be direct into the condenser, as in the example of Fig. 1; it is sufficient if the level of the water in A be below the level in $a$, which can always be arranged by raising the vacuum intensifier and bending the pipe $c$ to the shape of a swan's neck.

In this case the first length of the connecting piping has been shown, by way of example, of conical form, but a pipe C of uniform diameter, as in Fig. 1, can be used.

Figure 4:
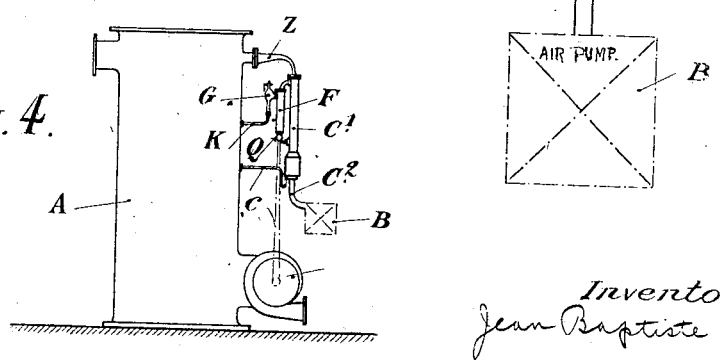
Fig. 4 is an elevation on a reduced scale of a mixing condenser, of suitable type, provided with the vacuum augmenter.

Fig. 4 shows in elevation, to reduced scale, a mixing condenser provided with a vacuum augmenter as described.

Fig. 5 shows the application of the invention to a system of surface condensation.

The two latter figures, which are diagrammatic, show the simple mounting of the augmenter, and the small space occupied by it since it forms part of the air induction piping.

In all the preceding figures, the cooling medium of the cooling device has been assumed to be of surface type. Fig. 6 shows an example of an augmenter with a spraying cooling element.

The working remains, for the most part, the same as previously, but the arrangement of the parts is modified; the same letters indicate the corresponding parts.

The evaporator F is furnished with an ejector G discharging into the condenser A; $C^1$ represents again the casing of the auxiliary condenser or, in other words, the spray cooling element.

At the bottom of the evaporator F is a valve $g$ held on its seat by a spring $h$; without this spring, and supposing that there is no water in the evaporator F, the difference of pressure between that in the evaporator F and in the cooler $C^1$ suffices to maintain the valve $g$ closed; the spring $h$ is arranged to balance the weight of the valve and a certain depth of water in evaporator F; as soon as this level is exceeded the load increasing on the valve, this latter opens and insures the flow of this cooled water toward the cooling device $C^1$; for increasing the condensing surface, the cooled water passes into a perforated receptacle $i$ which distributes it in fine streams.

The air saturated with vapor arriving from the principal condenser A by the conduit C rises in the cooling device $C^1$, in which the air is dried and cooled; the mixture, diminished in weight and compressed, is finally sucked out by the extracting apparatus through the conduit $C^2$ whose inlet is provided with a trap $j$ for preventing any liquid entering the extractor apparatus.

The cooled water, slightly reheated, falls to the bottom of the cooling device $C^1$, carrying with it the steam which it has condensed.

The pump Q, mounted in this case directly under the branch $C^1$, takes the mixture of cooling water and condensate from the bottom of $C^1$ and returns it continuously to the top of the evaporator F where it is distributed in a spray and submitted to another cooling.

In this case again, the work of the pump Q is a minimum by reason of the small lift and the very small amount to be dealt with.

If the quantity of condensed water which the pump Q returns to the evaporator F at the same time as the circulating water does not equal the total quantity evaporated under the action of the ejector G, recourse is had to a supply by conduit X, the quantity being automatically regulated by means of a float valve $X^1$.

As it will be seen, the spray system is no more complicated than the surface system, and the mounting of the one or the other does not present any difficulty, whatever may be the relative positions of the condenser and the air extracting apparatus.

What I claim is:

1. In a condensing apparatus, a main condenser, exhaust-means communicating with the main condenser, and a vacuum-augmenter comprising an auxiliary condenser interposed in the communication between the main condenser and the exhaust-means, a refrigerating chamber provided with means for reducing the pressure therein, and means for circulating a fluid medium through the refrigerating chamber and the auxiliary condenser, said medium being cooled in the refrigerating chamber by evaporation effected by the reduced pressure in said chamber and the cooled medium in passing through the auxiliary condenser condensing the moisture in the vapor drawn through said auxiliary condenser from the main condenser by the exhaust-means.

2. In a condensing apparatus, a main condenser, exhaust-means communicating with the main condenser, and a vacuum-augmenter comprising an auxiliary condenser interposed in the communication between the main condenser and the exhaust-means, a refrigerating chamber provided with means for reducing the pressure therein, means for circulating a fluid medium through the refrigerating chamber and the auxiliary condenser, said medium being cooled in the refrigerating chamber by evaporation effected by the reduced pressure in said chamber and the cooled medium in passing through the auxiliary condenser condensing the moisture in the vapor drawn through said auxiliary condenser from the main condenser by the exhaust-means, and means in the auxiliary condenser for separating the condensate from the air before the latter passes to the exhaust-means.

3. In a condensing apparatus, a main condenser, exhaust-means communicating with the main condenser, and a vacuum-augmenter comprising an auxiliary condenser interposed in the communication between the main condenser and the exhaust-means, a refrigerating chamber provided with means for reducing the pressure therein, means for circulating a fluid medium through the refrigerating chamber and the auxiliary condenser, said medium being cooled in the refrigerating chamber by evaporation effected by the reduced pressure in said chamber and the cooled medium in passing through the auxiliary condenser condensing the moisture in the vapor drawn through said auxiliary condenser from the main condenser by the exhaust-means, means in the auxiliary condenser for separating the condensate from the air before the latter passes to the exhaust-means, and a discharge pipe for the condensate leading from the auxiliary condenser to the main condenser.

4. In a condensing apparatus, a main condenser, exhaust-means communicating with the main condenser, and a vacuum-augmenter comprising an auxiliary condenser interposed in the communication between the main condenser and the exhaust-means, a refrigerating chamber provided with means for reducing the pressure therein, means for circulating a fluid medium through the refrigerating chamber and the auxiliary condenser, said medium being cooled in the refrigerating chamber by evaporation effected by the reduced pressure in said chamber and the cooled medium in passing through the auxiliary condenser condensing the moisture in the vapor drawn through said auxiliary condenser from the main condenser by the exhaust-means, means in the auxiliary condenser for separating the condensate from the air before the latter passes to the exhaust-means, and a discharge pipe for the condensate leading from the auxiliary condenser to the main condenser at a level above the bottom of the auxiliary condenser to maintain in the latter a part of the condensate to form a chilling medium with which the air contacts for a final condensation before it passes to the exhaust-means.

5. In a condensing apparatus, a main condenser, exhaust-means communicating with the main condenser, and a vacuum-augmenter comprising a casing having a conduit interposed in the communication between the main condenser and the exhaust-means, a refrigerating chamber in the casing provided with means for reducing the pressure therein, and a pipe connecting opposite ends of the refrigerating chamber to circulate a fluid medium through the refrigerating chamber and the conduit, said medium being cooled in the refrigerating chamber by evaporation effected by the reduced pressure in said chamber and the cooled medium passing through the pipe condensing the moisture in the vapor drawn through the conduit from the main condenser by the exhaust-means.

6. In a condensing apparatus, a main condenser, exhaust-means communicating with the main condenser, and a vacuum-augmenter comprising a casing having a conduit interposed in the communication between the main condenser and the exhaust-means, a refrigerating chamber in the casing provided with means for reducing the pressure therein, a pipe connecting opposite ends of the refrigerating chamber to circulate a fluid medium through the refrigerating chamber and the conduit, said medium being cooled in the refrigerating chamber by evaporation effected by the reduced pressure in said chamber and the cooled medium passing through the pipe condensing the moisture in the vapor drawn through the conduit from the main condenser by the exhaust-means, and means in the lower part of the conduit for separating the condensate from the air before the latter passes to the exhaust-means.

7. In a condensing apparatus, a main condenser, exhaust-means communicating with the main condenser, and a vacuum-augmenter comprising a casing having a conduit interposed in the communication between the main condenser and the exhaust-means, a refrigerating chamber in the casing provided with means for reducing the pressure therein, a pipe connecting opposite ends of the refrigerating chamber to circulate a fluid medium through the refrigerating chamber and the conduit, said medium being cooled in the refrigerating chamber by evaporation effected by the reduced pressure in said chamber and the cooled medium passing through the pipe condensing the moisture in the vapor drawn through the conduit from the main condenser by the exhaust-means, means in the lower part of the conduit for separating the condensate from the air before the latter passes to the exhaust-means, and a discharge pipe for the condensate leading from the conduit to the main condenser.

8. In a condensing apparatus, a main condenser, exhaust-means communicating with the main condenser, and a vacuum-augmenter comprising a casing having a conduit interposed in the communication between the main condenser and the exhaust-means, a refrigerating chamber in the casing provided with means for reducing the pressure therein, a pipe connecting opposite ends of the refrigerating chamber to circulate a fluid medium through the refrigerating chamber and the conduit, said medium being cooled in the refrigerating chamber by evaporation effected by the reduced pressure in said chamber and the cooled medium passing through the pipe condensing the moisture in the vapor drawn through the conduit from the main condenser by the exhaust-means, means in the lower part of the conduit for separating the condensate from the air before the latter passes to the exhaust-means, and a discharge pipe for the condensate leading from the conduit to the main condenser at a level above the bottom of the conduit to maintain in the lower part of the conduit a chilling medium with which the air contacts for a final condensation before it passes to the exhaust-means.

9. In a condensing apparatus, a main condenser, exhaust-means communicating with the main condenser, and a vacuum-augmenter comprising a casing having a conduit interposed in the communication between the main condenser and the exhaust-means, a refrigerating chamber in the casing provided with means for reducing the pressure therein, a pipe connecting opposite ends of the refrigerating chamber to circulate a fluid medium through the refrigerating chamber and the conduit, said medium being cooled in the refrigerating chamber by evaporation effected by the reduced pressure in said chamber and the cooling medium passing through the pipe condensing the moisture in the vapor drawn through the conduit from the main condenser by the exhaust-means, and a helical rib on said pipe within the conduit to increase the cooling surface of the pipe and to prolong the contact of the passing vapor with such cooling surface.

10. In a condensing apparatus, a main condenser, exhaust-means communicating with the main condenser, and a vacuum-augmenter comprising a casing having a conduit interposed in the communication between the main condenser and the exhaust-means, a refrigerating chamber in the casing provided with pressure-reducing means, and means for circulating a fluid medium successively through said refrigerating chamber and said conduit, said medium being cooled in its passage through the refrigerating chamber by the evaporation effected by the reduced pressure in said chamber and the cooled medium in its passage through the conduit condensing the moisture in the vapor drawn through said conduit from the main condenser by the exhaust-means.

11. In a condensing apparatus, a main condenser, exhaust-means communicating with the main condenser, and a vacuum-augmenter comprising a casing having a conduit interposed in the communication between the main condenser and the exhaust-means, a refrigerating chamber in the casing provided with pressure-reducing means, means for circulating a fluid medium successively through said refrigerating chamber and said conduit, said medium being cooled in its passage through the refrigerating chamber by the evaporation effected by the reduced pressure in said chamber and the cooled medium in its passage through the conduit condensing the moisture in the vapor drawn through said conduit from the main condenser by the exhaust-means, and means for retaining a portion of the condensate in the lower part of the conduit to form a chilling medium to condense further the moisture in the vapor entering the conduit.

12. In a condensing apparatus, a main condenser, exhaust-means communicating with the main condenser, and a vacuum-augmenter comprising a casing having a conduit interposed in the communication between the main condenser and the exhaust means, a refrigerating chamber in the casing provided with pressure-reducing means, means for circulating a fluid medium successively through the refrigerating chamber and the conduit, and means for spraying the fluid medium as it enters the upper part of the refrigerating chamber, the sprayed medium being cooled in its passage through the refrigerating chamber by the evaporation effected by the reduced pressure in said chamber and the cooled medium in its passage through the conduit condensing the moisture in the vapor drawn through said conduit from the main condenser by the exhaust-means.

13. In a condensing apparatus, a main condenser, exhaust-means communicating with the main condenser, and a vacuum-augmenter comprising an auxiliary condenser interposed in the communication between the main condenser and the exhaust-means, a refrigerating chamber communicating with the main condenser, an ejector in the communication between the refrigerating chamber and the main condenser and directed toward the main condenser to reduce the pressure in the refrigerating chamber, and means for circulating a fluid medium successively through the refrigerating chamber and the auxiliary condenser, said medium being cooled in its passage through the refrigerating chamber by the evaporation effected by the reduced pressure in said chamber and the cooled medium in its passage through the auxiliary condenser condensing the moisture in the vapor drawn through said auxiliary condenser from the main condenser by the exhaust-means.

14. In a condensing apparatus, a main condenser, exhaust-means communicating with the main condenser, and a vacuum-augmenter comprising an auxiliary condenser interposed in the communication between the main condenser and the exhaust-means, a refrigerating chamber communicating with the main condenser, an ejector in the communication between the refrigerating chamber and the main condenser and directed toward the main condenser to reduce the pressure in the refrigerating chamber, means for circulating a fluid medium successively through the refrigerating chamber and the auxiliary condenser, said medium being cooled in its passage through the refrigerating chamber by the evaporation effected by the reduced pressure in said chamber and the cooled medium in its passage through the auxiliary condenser condensing the moisture in the vapor drawn through said auxiliary condenser from the main condenser by the exhaust-means, and a fluid-supply pipe leading to the refrigerating chamber to replace the evaporated fluid medium withdrawn from the refrigerating chamber by the ejector.

15. In a condensing apparatus, a main condenser, exhaust-means communicating with the main condenser, and a vacuum-augmenter comprising an auxiliary condenser interposed in the communication between the main condenser and the exhaust-means, a refrigerating chamber communicating with the main condenser, an ejector in the communication between the refrigerating chamber and the main condenser and directed toward the main condenser to reduce the pressure in the refrigerating chamber, means for circulating a fluid medium successively through the refrigerating chamber and the auxiliary condenser, said medium being cooled in its passage through the refrigerating chamber by the evaporation effected by the reduced pressure in said chamber and the cooled medium in its passage through the auxiliary condenser condensing the moisture in the vapor drawn through said auxiliary condenser from the main condenser by the exhaust-means, a fluid-supply pipe leading to the refrigerating chamber to replace the evaporated fluid medium withdrawn from the refrigerating chamber by the ejector, and a float-valve controlling the inlet of the supply-pipe into the refrigerating chamber to maintain fluid medium supply at a predetermined level.

16. In a condensing apparatus, a main condenser, exhaust means communicating with the main condenser, and a vacuum-augmenter comprising a casing having a conduit interposed in the communication between the main condenser and the exhaust-means, a refrigerating chamber in the casing having an ejector leading from its upper part to reduce the pressure in said chamber, means for circulating a fluid medium successively through said refrigerating chamber and said conduit, means for spraying the fluid medium as the latter enters the refrigerating chamber, and a partition in the upper part of the refrigerating chamber between the spraying means and the ejector connection, the sprayed medium being cooled in its passage through the refrigerating chamber by the evaporation effected by the reduced pressure in said chamber and the cooled medium in its passage through the conduit condensing the moisture in the vapor drawn through said conduit from the main condenser by the exhaust-means.

In testimony whereof I have signed this specification.

JEAN BAPTISTE COTTARD.

Witnesses:
MARCEL GUILLEMOT,
CHAS. P. PRESSLY.